(12) United States Patent
Zhang et al.

(10) Patent No.: US 10,678,594 B2
(45) Date of Patent: Jun. 9, 2020

(54) SYSTEM AND METHOD FOR OPTIMIZING RESOURCE ALLOCATION USING GPU

(71) Applicant: Alipay Labs (Singapore) Pte. Ltd., Singapore (SG)

(72) Inventors: Xingwen Zhang, San Mateo, CA (US); Feng Qi, San Mateo, CA (US); Zhigang Hua, San Mateo, CA (US); Shuang Yang, San Mateo, CA (US)

(73) Assignee: Alipay Labs (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/738,067

(22) Filed: Jan. 9, 2020

(65) Prior Publication Data

US 2020/0142743 A1   May 7, 2020

(51) Int. Cl.
   *G06F 9/46*   (2006.01)
   *G06F 9/50*   (2006.01)
   *G06T 1/20*   (2006.01)

(52) U.S. Cl.
   CPC .............. *G06F 9/5011* (2013.01); *G06T 1/20* (2013.01); *G06T 2200/04* (2013.01)

(58) Field of Classification Search
   CPC .................................................... G06F 9/5011
   USPC ........................................................ 718/104
   See application file for complete search history.

(56) References Cited

U.S. PATENT DOCUMENTS

| | | | | |
|---|---|---|---|---|
| 5,148,365 A | * | 9/1992 | Dembo | G06Q 10/06 705/36 R |
| 5,537,593 A | * | 7/1996 | Diamond | G06F 15/17337 719/313 |
| 8,701,069 B1 | | 4/2014 | Dimond | |
| 8,744,888 B2 | | 6/2014 | Li et al. | |

(Continued)

FOREIGN PATENT DOCUMENTS

WO    2016169828 A1    10/2016

OTHER PUBLICATIONS

Zhong et al., "Stock Constrained Recommendation in Tmall," Proceedings of the 21th ACM SIGKDD International Conference on Knowledge Discovery and Data Mining, Aug. 2015, 2287-2296 (10 pages).

(Continued)

*Primary Examiner* — Timothy A Mudrick

(57) ABSTRACT

Methods, systems, and apparatus, including computer programs encoded on computer storage media, for optimizing resource allocation are provided. One of the methods includes: processing a plurality of first objective functions in parallel to determine a plurality of allocation plans, wherein each of the allocation plans corresponds to allocating zero or more of a plurality of resources associated with a platform to a user, and the plurality of first objective functions share one or more dual multipliers; determining a plurality of profits and costs for the platform in parallel based on the plurality of the allocation plans; aggregating the calculated profits and costs using parallel reduction; updating the one or more dual multipliers based on the aggregated costs to (Continued)

determine whether an exit condition is satisfied; if the exit condition is not satisfied, repeating the processing the plurality of the first objective functions based on the updated dual multipliers.

20 Claims, 7 Drawing Sheets

(56) References Cited

U.S. PATENT DOCUMENTS

| | | | |
|---|---|---|---|
| 8,874,477 B2* | 10/2014 | Hoffberg | G06Q 20/065 |
| | | | 705/37 |
| 9,152,462 B2 | 10/2015 | Takano | |
| 9,330,356 B2 | 5/2016 | Hunt et al. | |
| 9,407,944 B1 | 8/2016 | Galdy et al. | |
| 10,133,599 B1 | 11/2018 | Sandstrom | |
| 10,268,513 B2 | 4/2019 | Jackson et al. | |
| 10,348,600 B2 | 7/2019 | Perry | |
| 10,379,868 B1 | 8/2019 | Proshin et al. | |
| 2002/0156667 A1* | 10/2002 | Bergstrom | G06Q 10/04 |
| | | | 705/7.22 |
| 2016/0285722 A1 | 9/2016 | Min et al. | |
| 2018/0260253 A1 | 9/2018 | Nanda et al. | |
| 2019/0036639 A1 | 1/2019 | Huang et al. | |
| 2019/0065892 A1 | 2/2019 | Xu et al. | |
| 2019/0347137 A1 | 11/2019 | Sivaraman et al. | |

OTHER PUBLICATIONS

Zhang et al., "Solving Billion-Scale Knapsack Problems via Distributed Synchronous Coordinate Descent," KDD'2019, Aug. 4-8, 2019 (11 pages).

* cited by examiner

SYSTEM AND METHOD FOR OPTIMIZING RESOURCE ALLOCATION USING GPU

TECHNICAL FIELD

The disclosure relates generally to optimizing resource allocation in recommender systems.

BACKGROUND

E-commerce platforms make resource allocation decisions frequently (e.g., daily, hourly, or even in near real-time). These resource allocation problems are usually approached by solving knapsack problems (KPs), which have been tractable only at a relatively small scale. Optimizing resource allocation decisions at a large scale has been an open technical challenge.

SUMMARY

Various embodiments of the present specification may include systems, methods, and non-transitory computer readable media for optimizing resource allocation.

According to one aspect, the method for optimizing resource allocation may comprise: processing a plurality of first objective functions in parallel to determine a plurality of allocation plans, wherein each of the allocation plans corresponds to allocating zero or more of a plurality of resources associated with a platform to a user, and the plurality of first objective functions share one or more dual multipliers; determining a plurality of profits and costs for the platform in parallel based on the plurality of the allocation plans; aggregating the calculated profits and costs using parallel reduction; updating the one or more dual multipliers based on the aggregated costs to determine whether an exit condition is satisfied; and in response to the exit condition not being satisfied, repeating the processing the plurality of the first objective functions based on the updated one or more dual multipliers.

In some embodiments, the processing a plurality of first objective functions in parallel may comprise processing the plurality of first objective functions in parallel on a Graphics Processing Unit (GPU); the determining a plurality of profits and costs for the platform in parallel may comprise determining the plurality of profits and costs in parallel on the GPU; the aggregating the calculated profits and costs using parallel reduction may comprise aggregating the calculated profits and costs by the GPU and a Central Processing Units (CPU); and the updating the one or more dual multipliers may comprise updating the one or more dual multipliers by the CPU.

In some embodiments, each of the plurality of first objective functions comprises N×M coefficients, N being the number of the plurality of users, M being the number of the plurality of resources; and prior to the processing a plurality of first objective functions, the method further comprises: storing, in a memory of the GPU, non-zero coefficients of the N×M coefficients with a value table and an index table for the GPU to access the memory with constant time complexity per read; the value table uses a resource identifier as a primary dimension; and the index table uses a user identifier as a primary dimension.

In some embodiments, the storing, in a memory of the GPU, non-zero values of the N×M coefficients with a value table and an index table may comprise: in the value table, storing resource identifier values mapped to the non-zero coefficients; and in the index table, storing one or more user identifier values mapped to one or more indexes in the value table, wherein for each user identifier value, the corresponding index may point to one of the non-zero coefficients associated with a user identified by the each user identifier value.

In some embodiments, each of the plurality of first objective functions may subject to K constraints, and may comprise N×M×K coefficients; and prior to the processing a plurality of first objective functions, the method may further comprise: storing, in a memory of the GPU, non-zero values of the N×M×K coefficients into a row-major format comprising at least three dimensions for the GPU to access the memory with constant time complexity per read.

In some embodiments, the method may further comprise: in response to the exit condition being satisfied, allocating the plurality of resources according to the plurality of allocation plans, wherein the number of the plurality of users is N, the number of the plurality of resources is M, an $i_{th}$ of the plurality of allocation plans corresponds to an $i_{th}$ user, $\forall i \in \{1, \ldots, N\}$, and the $i_{th}$ allocation plan is represented as a vector comprising M elements $x_{ij}$, $\forall j \in \{1, \ldots, M\}$, each $x_{ij}$ representing whether a $j_{th}$ resource is being allocated to the $i_{th}$ user.

In some embodiments, the exit condition may comprise whether the one or more dual multipliers are converged.

In some embodiments, before processing the plurality of first objective functions in parallel, the method may further comprise: transforming a primal objective function for optimizing the resource allocation into a dual objective function based on Lagrangian techniques for dual problem transformation; and decomposing the dual objective function into the plurality of the first objective functions.

In some embodiments, the exit condition may comprise whether a value of the primal objective function and a value of the dual objective function are converged, and the method may further comprise: determining the value of the primal objective function based on the aggregated profits and costs; and determining the value of the dual objective function based on the one or more dual multipliers and the aggregated profits and costs.

According to another aspect, a system for optimizing resource allocation may comprise a plurality of sensors and a computer system that comprises a first computing device and a second computing device, the computer system comprising a processor and a non-transitory computer-readable storage medium storing instructions executable by the processor to cause the system to perform operations comprising: processing a plurality of first objective functions in parallel to determine a plurality of allocation plans, wherein each of the allocation plans corresponds to allocating zero or more of a plurality of resources associated with a platform to a user, and the plurality of first objective functions share one or more dual multipliers; determining a plurality of profits and costs for the platform in parallel based on the plurality of the allocation plans; aggregating the calculated profits and costs using parallel reduction; updating the one or more dual multipliers based on the aggregated costs to determine whether an exit condition is satisfied; and in response to the exit condition not being satisfied, repeating the processing the plurality of the first objective functions based on the updated one or more dual multipliers.

According to yet another aspect, a non-transitory computer-readable storage medium for optimizing resource allocation may be configured with instructions executable by one or more processors to cause the one or more processors to perform operations comprising: processing a plurality of first objective functions in parallel to determine a plurality of allocation plans, wherein each of the allocation plans corresponds to allocating zero or more of a plurality of resources associated with a platform to a user, and the plurality of first objective functions share one or more dual multipliers; determining a plurality of profits and costs for the platform in parallel based on the plurality of the allocation plans; aggregating the calculated profits and costs using parallel reduction; updating the one or more dual multipliers based on the aggregated costs to determine whether an exit condition is satisfied; and in response to the exit condition not being satisfied, repeating the processing the plurality of the first objective functions based on the updated one or more dual multipliers.

Embodiments disclosed in the specification have one or more technical effects. In some embodiments, one or more GPUs are used to perform parallel computations in order to determine an optimal resource allocation solution for a platform (e.g., an e-commerce platform) to distribute resources (e.g., monetary or non-monetary resources) to users (e.g., customers, employees, departments). In one embodiment, the GPUs may parallelly solve a plurality of objective functions, with each objective function corresponding to one of the users. The parallel computation power offered by the GPUs may effectively tackle the most time-consuming and computing-intensive portion of the search for the optimal resource allocation solution. In some embodiments, the solutions to the plurality of objective functions may be parallelly reduced (e.g., aggregated) by using a subset of the one or more GPUs and one or more CPUs (e.g., Compute Unified Device Architecture (CUDA) framework for parallel reduction). In some embodiments, the above-mentioned parallel computation and reduction enables the platform to determine an optimal resource allocation solution at scale (e.g., allocating resources to millions of users). In some embodiments, the memory layout of the GPUs designed for the parallel computation of the plurality of objective function may avoid binary searches when a coefficient needs to be read from the memory, and provide memory access with constant time complexity per read during the parallel computation. In some embodiments, the memory layout may also reduce memory footprint by avoid storing repetitive values such as user identifiers.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
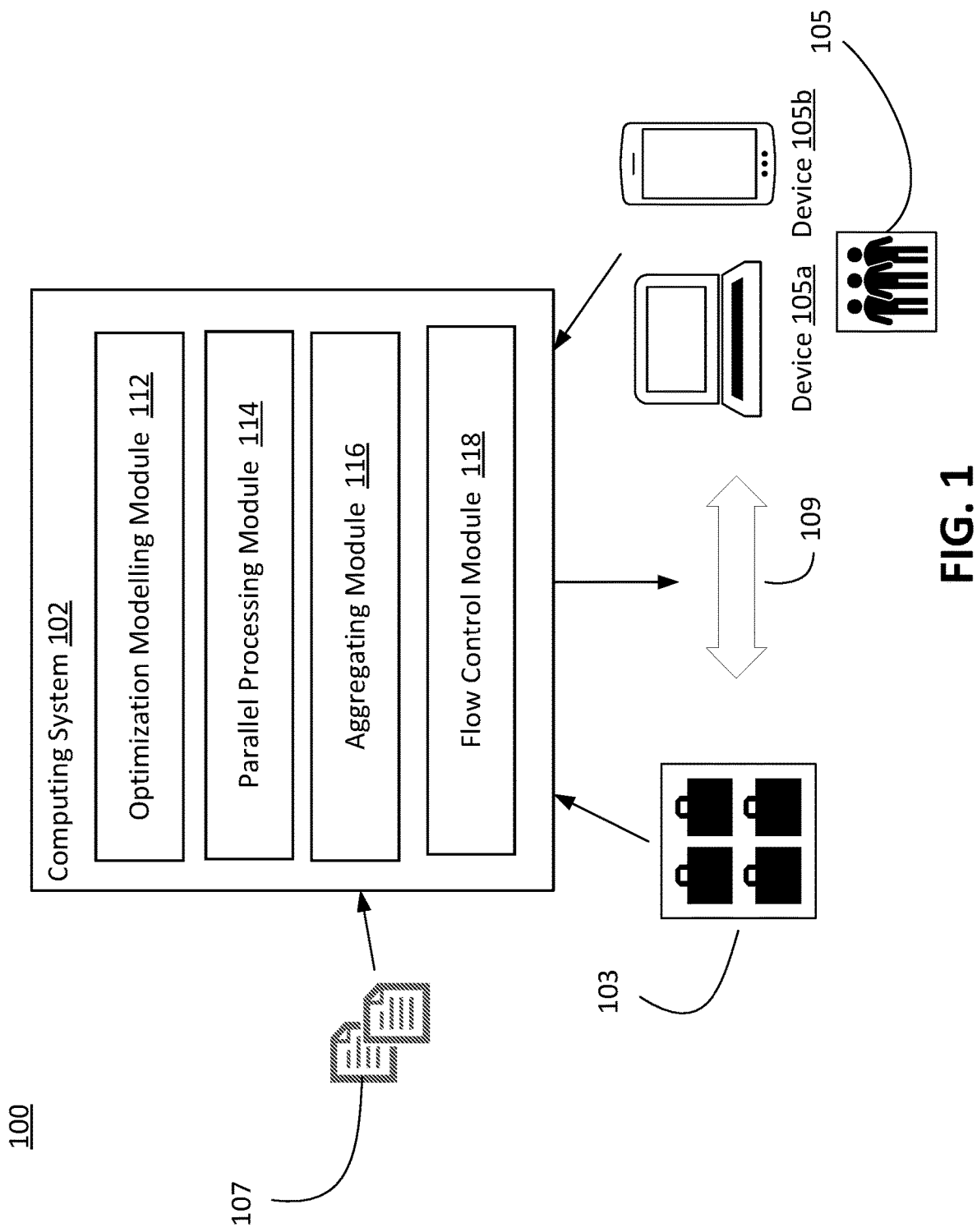
FIG. 1 illustrates an example environment to which techniques for determining optimal resource allocation may be applied, in accordance with various embodiments.

The embodiments disclosed herein may help distribution systems (e.g., ecommerce platforms) to optimize resource allocation decisions using parallel processing methods. The resources may include financial budgets (e.g., loans, marketing promotions, ads spending, asset portfolios) that are to be distributed among users/user groups, non-monetary resources such as internet user traffics (e.g., impressions, clicks, dwell time) that need to be allocated among different business channels, etc. The purpose of these resource allocation decisions may be for optimizing a joint objective, such as maximizing expected user conversions in the case of marketing campaign or the number of daily active users.

In some embodiments, optimizing resource allocation for a platform may involve seeking for an optimal resource allocation plan to distribute the resources to a plurality of users. The resources of the platform to be allocated may be denoted as a group of items. Allocating one of the items to one user may result in a profit and a cost to the platform. In some embodiments, some of the items may be allocated more than once to one or more users. In some embodiments, these resources allocation decisions may be subject to a set of constraints (e.g., limited quantities of the resources, budget caps). These constraints may be classified into global constraints and local constraints, where the global constraints may specify the maximum amount of available resources, and the local constraints may impose restrictions for individual users or user groups.

In some embodiments, the above resource allocation optimization may be represented using the following formulas (1)-(4).

$$\max_{x_{i,j}} \sum_{i=1}^{N} \sum_{j=1}^{M} p_{i,j} x_{i,j}, \tag{1}$$

$$\text{s.t.} \sum_{i=1}^{N} \sum_{j=1}^{M} b_{i,j,k} x_{i,j} \le B_k, \forall k \in \{1, \ldots, K\} \tag{2}$$

$$\sum_{j=1}^{M} x_{i,j} \le U, \forall i \in \{1, \ldots, N\} \tag{3}$$

$$x_{i,j} \in \{0, 1\}, \forall i \in \{1, \ldots, N\}, \forall j \in \{1, \ldots, M\} \tag{4}$$

wherein N is a number of a plurality of users;
wherein M is a number of a plurality of items to be allocated;

The objective function in formula (1) may be denoted as a primal objective function, which represents the total profit to be gained by the platform if the resources are allocated according to $x_{i,j}$ (e.g., a resource allocation plan). Solving this primal objective function may require finding the optimal resource allocation plan $x_{i,j}$ that maximizes the primal objective function in formula (1). In one embodiment, the allocation plan determines if the $j_{th}$ item should be allocated to the $i_{th}$ user (or the $i_{th}$ group of users), then $x_{i,j}=1$, otherwise, $x_{i,j}=0$. In the formulas (1)-(4), the number of items to be allocated is denoted as M, and the number of users receiving the resources is denoted as N. In some embodiments, there may be multiple global constraints that the resource allocation plan must respect. For example, the platform may impose a budget limit on the total cost of the resources to be allocated (e.g., the total value of the items to be allocated must be below one thousand dollars), as well as a limit on the number of resources to be allocated (e.g., the number of items to be allocated must be below one hundred). The formula (2) generalizes the global const-raints by using K as the number of constraints (i.e., $B_k$, $\forall k \in \{1, \ldots, K\}$). For each of the K constraints, each item (e.g., resource) may be associated with a corresponding cost $b_{i,j,k}$ as shown in formula (2). For example, if the first constraint (e.g., k=1) corresponds to the budget limit of one thousand dollars, the $b_{i,j,1}$ may represent the cost (e.g., a dollar amount) of allocating the $j_{th}$ item to the $i_{th}$ user. As another example, if the second constraint (e.g., k=2) corresponds to the limit on the total number of items to be allocated, the $b_{i,j,2}$ may represent the cost (e.g., count as one) of allocating the $j_{th}$ item to the $i_{th}$ user.

In some embodiments, the U constraint in formula (3) may refer to a local constraint as it applies to an individual user (or a small group of users). For example, the U constraint in formula (3) may specify an upper bound on the number of items allowed to be received by each user. In some embodiments, this local constraint may be expanded to comprise a plurality of constraints. In some embodiments, the $B_k$ and U may be strictly positive, $p_{i,j}$ may be non-negative, and $b_{i,j,k}$ may be positive or negative.

In some embodiments, the $x_{i,j} \in \{0,1\}$ constraint (e.g., $x_{i,j}$ is a binary integer indicating either the $i_{th}$ user will or will not receive the $j_{th}$ item) may be optionally relaxed to $0 \leq x_{i,j} \leq 1$. To alleviate the impact of estimated noise in problem coefficients, the solution $x_{i,j}$ may be regularized by introducing an entropy function as a regularizer. For example, the entropy function may be defined as $-x_{i,j} \log x_{i,j}$. Thus, the primal objective function (e.g., formula (1)) may be represented using formula (5).

$$\max_{x_{i,j}} \sum_{i=1}^{N} \sum_{j=1}^{M} (p_{i,j} x_{i,j} - \alpha x_{i,j} \log x_{i,j}) \quad (5)$$

The $\alpha$ in formula (5) may be a predetermined regularization coefficient.

In some embodiments, in order to optimize the resource allocation represented in the formula (5) format, all possible solutions $x_{i,j}$ may be tried to find the best solution (e.g., the one maximizes the objective function in formula (5)). However, this brutal force solution may become impractical when the number of users is at large scale (e.g., millions). As a result, the objective function in formula (5) needs to be decomposed and solved by using parallel processing (e.g., using GPUs).

In some embodiments, in order to perform the decomposition of formula (5), the primal objective function in formula (5) may be first transformed in to a dual objective function by introducing a set of dual multipliers $\lambda = (\lambda_1, \ldots, \lambda_K)$, each corresponding to one of the K constraints in formula (2). In some embodiments, the dual objective function may be represented using formula (6).

$$\max_{x_{i,j}} \sum_{i=1}^{N} \sum_{j=1}^{M} (p_{i,j} x_{i,j} - \alpha x_{i,j} \log x_{i,j}) - \sum_{k=1}^{K} \lambda_k \left( \sum_{i=1}^{N} \sum_{j=1}^{M} b_{ijk} x_{ij} - B_k \right) \quad (6)$$

In some embodiments, the maximization problem in formula (6) may be subsequently decomposed into independent sub-problems, one for each user (or a user group). For example, the sub-problem for $i_{th}$ user may be represented as formula (7). In some embodiments, the $B_k$ of formula (6) may be omitted in formula (7) as it is not dependent on $x_{i,j}$. These independent sub-problems may be solved using parallel processing power of GPUs to improve efficiency. The parallel processing process is described in more detail below.

$$\max_{x_{i,j}} \sum_{j=1}^{M} (p_{i,j} x_{i,j} - \alpha x_{i,j} \log x_{i,j}) - \sum_{k=1}^{K} \lambda_k \left( \sum_{j=1}^{M} b_{i,j,k} x_{ij} \right) \quad (7)$$

FIG. 1 illustrates an example environment to which techniques for determining optimal resource allocation may be applied, in accordance with various embodiments. The components shown in FIG. 1 are intended to be illustrative. Depending on the implementation, the environment 100 may include additional, fewer, or alternative components.

As shown, the environment 100 in FIG. 1 may include a computing system 102. In some embodiments, the computing system 102 may be associated with a platform, such as an ecommerce platform (e.g., an online marketplace) hosting millions of users, or a small business serving a local community. The computing system 102 may be implemented in one or more networks (e.g., enterprise networks), one or more endpoints, one or more servers, one or more clouds, or any combination thereof. The computing system 102 may include hardware or software which manages access to a centralized resource or service in a network. A cloud may include a cluster of servers and other devices which are distributed across a network. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices.

In some embodiments, a resource allocation inquiry may comprise a request for the computing system 102 to search for an allocation plan to maximize an objective while respecting one or more constraints. The inquiry may also comprise information of the resources 103 to be allocated, information of the users 105 that the resources 103 are being allocated to, and one or more coefficients 107. In some embodiments, the coefficients 107 may comprise a plurality of projected (or predetermined/known) profits for the platform, each profit corresponding to allocating one of the resources to one user. For example, in order to maximize the number of daily active users (e.g., the objective function), a platform may offer users bonuses that may be claimed by logging in a mobile application of the platform and clicking through one or more buttons. Each user who claimed a bonus by performing the actions may be counted as a daily active user. As a result, allocating one bonus to one user may be associated with a projected profit (e.g., one daily active user if the bonus can attract the user to perform the actions). In some embodiments, the coefficients 107 may also comprise a plurality of costs for the platform associated with allocating each resource to a user. For example, each resource may be associated with a dollar amount, and thus allocating such resource may result in a cost of the dollar amount for the platform.

In some embodiments, the computing system 102 may include an optimization modeling module 112, a parallel processing module 114, an aggregating module 116, and a flow control module 118. The computing system 102 may include other modules. In some embodiments, the optimization modeling module 112 may build an optimization model in response to a resource allocation inquiry, which may comprise the information of the resources 103 to be allocated, the information of the users 105 communicating with the computing system 102 via computing devices such as (computers 105a, smart phones or tablets 105b), and the coefficients (e.g., projected or predetermined/known profits or costs, goals, budgets, constraints). For example, the optimization modeling module 112 may determine a primal objective function for the resource allocation inquiry shown in formula (5), transform the primal objective function into a dual objective function shown in formula (6) using Lagrangian techniques for dual problem transformation, and decompose the dual objective function into a plurality of sub-objective functions for the plurality of users 105.

In some embodiments, the parallel processing module 114 may comprise a plurality of processing units. In some embodiments, the processing units may refer to cores or threads of one or more GPUs. Each processing unit may independently solve one of the decomposed sub-objective functions for one user, wherein the each solution corresponds to a resource allocation plan for the user. In some embodiments, the plurality of decomposed sub-objective functions may share one or more dual multipliers (e.g., $\lambda_k$ shown in formula (7) that may be adjusted in order to search for the solution $x_{i,j}$). In some embodiments, the aggregating module 116 may comprise one or more processing units (e.g., cores or threads of GPUs) that parallelly collect the solutions from the processing units of the optimization modeling module 112. In some embodiments, the aggregating module 116 may share one or more processing units with the parallel processing module 114. In some embodiments, the aggregated solutions may be used to determine if the primal (e.g., formula (5)) and dual (e.g., formula (6)) objective functions are converged. In some embodiments, the aggregated solutions may also be used to adjust the dual multipliers $\lambda_k$ in dual objective function (e.g., formula (6)), and sub-objective functions (e.g., formula (7)).

In some embodiments, the flow control module 118 may manage the operations of the parallel processing module 114 and the aggregating module 116. In some embodiments, in response to the values of the objective functions (e.g., primal and dual objective functions) nor the dual multipliers $\lambda_k$ being converged, the flow control module 118 may instruct the parallel processing module 114 to repeat its operations (e.g., solving the sub-objective functions shown in formula (7) in parallel) using the parameters updated by the aggregating module 116 (e.g., the updated dual multipliers $\lambda_k$). In response to the aggregating module 116 determining that an exit condition is satisfied, the computing system 102 may terminate the process and identify an optimal solution 109 (e.g., a resource allocation plan) for the resource allocation inquiry. In some embodiments, the optimal solution 109 may be determined based on the aggregation of the plurality of solutions of the sub-objective functions.

Figure 2:
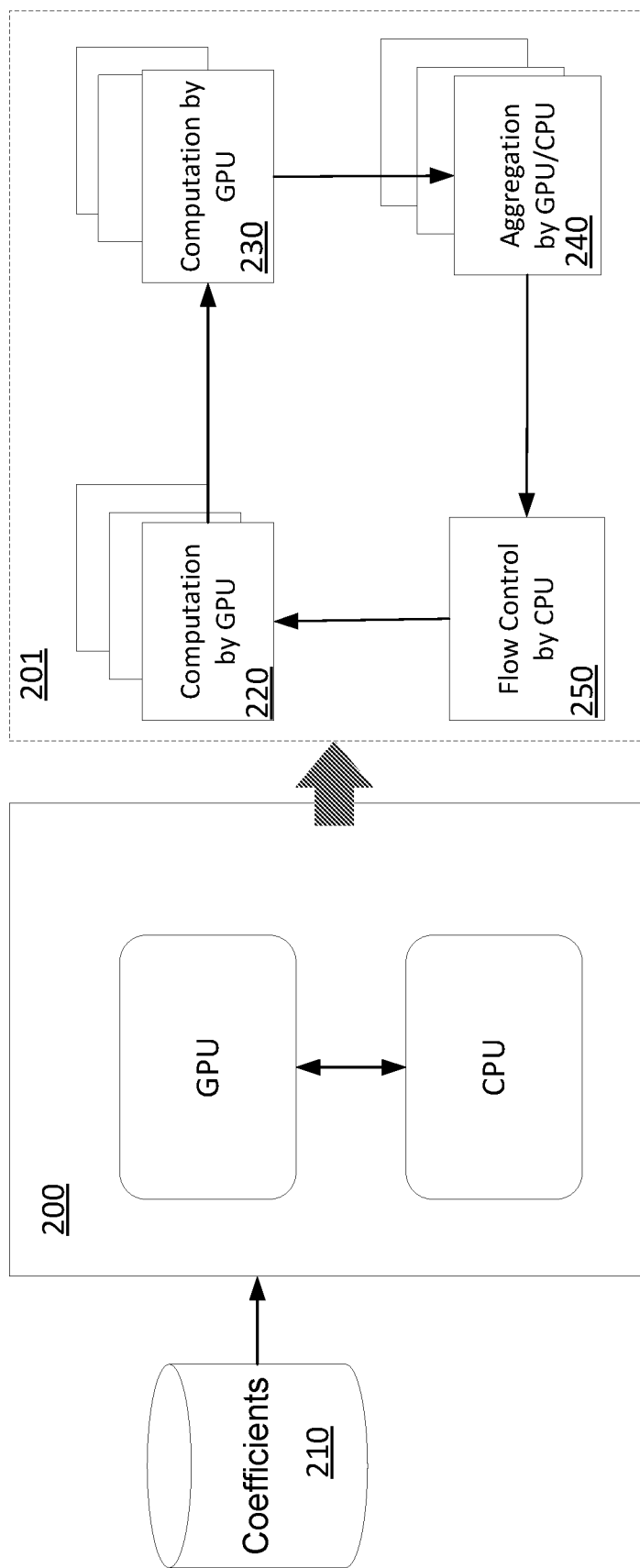
FIG. 2 illustrates an example device for determining optimal resource allocation, in accordance with various embodiments.

FIG. 2 illustrates an example device 200 for determining optimal resource allocation, in accordance with various embodiments. The device 200 shown in FIG. 2 may be used to implement the computing system 102 shown in FIG. 1. As shown, the device 200 in FIG. 2 may be equipped with one or more GPUs and CPUs to determine optimal resource allocation. GPUs' highly parallel structure makes them efficient at solving independent compute-intensive tasks in parallel. Due to the memory layout in each GPU, each computation occurred in GPUs (e.g., in each thread) may not support complex logics. As a result, CPUs may be used for serial instruction processing (e.g., more complicated computations) and flow controls (e.g., checking whether exit condition is satisfied).

In some embodiments, the device 200 may receive coefficients 210 from a resource allocation inquiry. The coefficients 210 may comprise a plurality of projected (or predetermined/known) profits and costs for the platform, each of which may be associated with allocating a resource to a user. The coefficients 210 may also comprise one or more constraints, such as global constraints (e.g., a total budget), local constraints (e.g., a limit of number of resources may be allocated to one user).

In some embodiments, the optimization problem defined by the coefficients 210 may be decomposed into a plurality of sub-optimization problems. For example, the primal objective function of the optimization problem (e.g., formula (5)) corresponding to the overall objective of the resource allocation inquiry may be decomposed into a plurality of sub-objective functions (e.g., formula (7)) for each individual user. The flow chart 201 in FIG. 2 illustrates an example workflow for determining optimal resource allocation using the device 200. In some embodiments, the device 200 may rely on the one or more GPUs to solve the plurality of sub-objective functions in parallel at step 220. For example, one GPU may comprise a plurality of grids, and each grid may contain several blocks. Each block may host a plurality of threads, which may be used to process or solve one of more of the sub-optimization problems (e.g., the sub-objective functions). In some embodiments, if the sub-objective functions are formed as integer programming (IP) problems, they may be solved by using open source or commercially available IP solvers such as Cplex, Gurobi, another suitable tool, or any combination thereof. For example, the solution for each of the sub-objective functions may comprise a vector (or a matrix) representing an allocation plan for a user.

In some embodiments, after the plurality of allocations plans for the plurality of users are determined at step 220, the one or more GPUs may proceed to perform computations based on the allocations plans in parallel at step 230. In some embodiments, the one or more GPUs may compute at step 230, for each of the allocation plans, a per-user profit based on the summation of the profits of the resources being allocated to the user. For example, if a sub-objective function is represented as formula (7), the per-user profit for the $i_{th}$ user may be represented as formula (8), wherein $x_{i,j}$ is a determined allocation plan, and $p_{i,j}$ is from the projected (or predetermined/known) profits in the coefficients 210.

$$\sum_{j=1}^{M} p_{i,j} x_{i,j} \quad (8)$$

In some embodiments, the one or more GPUs may compute at step 230, for each of the allocation plans (e.g., for the corresponding individual user), a value of the entropy function based on the each allocation plan. For example, if a sub-objective function is represented as formula (7), the value of the entropy function may be represented as formula (9).

$$\sum_{j=1}^{M} x_{i,j} \log x_{i,j} \quad (9)$$

In some embodiments, the one or more GPUs may also compute at step 230, for each of the allocation plans, a per-user cost based on the summation of the costs of the resources being allocated to the user. For example, if a sub-objective function is represented as formula (7), and assuming there is only one type of constraint (e.g., K in formula (7) is 1), the per-user cost for the $i_{th}$ user may be represented as formula (10).

$$\sum_{j=1}^{M} b_{i,j} x_{i,j} \quad (10)$$

In some embodiment, a resource may be associated with multiple constraints. For each of the constraints, allocating the resource may result in a cost. For example, offering a bonus for a user on a given day may result in a cost of the daily total bonus budget (e.g., first constraint), as well as a cost of the total number of bonuses allowed to be offered (e.g., second constraint). Assuming there are k constraints, the one or more GPUs may compute at step 230, for each of the allocation plans, k per-user costs corresponding to the k constraints, as represented as formula (11).

$$\sum_{j=1}^{M} b_{i,j,k} x_{i,j} \quad (11)$$

In some embodiments, after the parallel computing at step 230 is finished, the plurality of the per-user profits, the per-user entropy function values, the per-user costs may be aggregated at step 240. For example, these values may first go through parallel reduction one or more of the GPUs (e.g., using CUDA), and then eventually yield a total profit (e.g., a summation of the per-user profits), a total entropy value (e.g., a summation of the per-user entropy function values), and a total cost (e.g., a summation of the per-user costs) to a CPU. If there are K constraints, there may be K total costs to be aggregated. As another example, the values may be directly aggregated by the CPU. The total profit, the total entropy value, the K total cost may be mapped to $$\sum_{i=1}^{N} \sum_{j=1}^{M} p_{i,j} x_{i,j}, \sum_{i=1}^{N} \sum_{j=1}^{M} \alpha x_{i,j} \log x_{i,j},$$

and $$\sum_{i=1}^{N} \sum_{j=1}^{M} b_{i,j,k} x_{ij} - B_k$$

$$\forall k \in \{1, \ldots, K\}$$

of formula (6), respectively.

In some embodiments, based on the total profit, the total entropy value, and the total cost aggregated at step 240, the CPUs in the device 200 may perform flow control at step 250. The flow control may comprise determining whether an exit condition is satisfied. In some embodiments, if the dual objective function is represented as formula (6), the exit condition may be satisfied if the dual multipliers $\lambda_k \forall k \in \{1, \ldots, K\}$ are converged. In some embodiments, the exit condition may be satisfied if the primal objective function value (e.g., formula (5)) and the dual objective function value (e.g., formula (6)) have converged (e.g., the gap between them is below a predefined threshold).

In some embodiments, in response to the exit condition not being satisfied, the CPU may update the dual multipliers $\lambda_k \forall k \in \{1, \ldots, K\}$ at step 250, and send the updated dual multipliers to the one or more GPUs to repeat the computation at step 220. In some embodiments, the dual multipliers may be updated using dual descent algorithm, as shown in formula (12).

$$\lambda_k^{t+1} = \max\left(\lambda_k^t + \eta\left(\sum_{i=1}^{N} \sum_{j=1}^{M} b_{ijk} x_{ij} - B_k\right), 0\right) \quad (12)$$

where the hyper-parameter $\eta$ is a learning rate.

Figure 3:
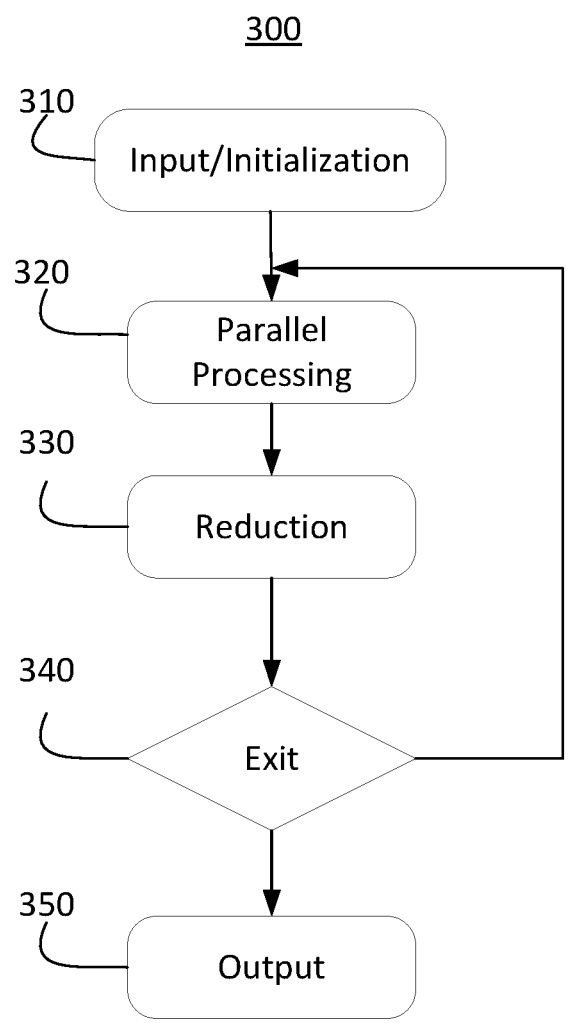
FIG. 3 illustrates an example work flow for determining optimal resource allocation, in accordance with various embodiments.

FIG. 3 illustrates an example workflow for determining optimal resource allocation, in accordance with various embodiments. The workflow 300 may be performed by the computing system 102 in FIG. 1 or the device 200 in FIG. 2. As shown, the workflow 300 may start with receiving an input (e.g., resource allocation inquiry) and performing initialization at step 310. In some embodiments, the input may comprise a plurality of coefficients including information of the resources to be allocated (e.g., projected/predetermined/known profits and costs associated, global constraints, local constraints), information of the users receiving the resources (e.g., quantities), another suitable information, or any combination thereof. In some embodiments, the workflow 300 may proceed to initialization at step 310. The initialization may comprise initializing one or more dual multipliers, other parameters, or any combination thereof. With the input and initialized parameters, a primal optimization problem (e.g., formula (5)) may be determined. In some embodiments, the primal optimization problem may be transferred into dual optimization problem (e.g., formula (6)), and then de-composed into a plurality of sub-optimization problems (e.g., formula (7)).

In some embodiments, the plurality of sub-optimization problems may be parallelly solved to determine a plurality of resource allocation plans at step 320. In some embodiments, this parallel processing step 320 may be implemented using various mechanisms, such as Compute Unified Device Architecture (CUDA) platform/model that allows direct access to graphics processing unit (GPU)'s virtual instruction set and parallel computational elements, multi-threading programming, map/reduce framework, another suitable mechanism, or any combination thereof. In some embodiments, each solution of the sub-optimization problems may correspond to a resource allocation plan for a user. Each of these sub-optimization problems may be parallelly solved using one or more GPUs to provide, for the $i_{th}$ user, a vector (or a matrix) of $\{x_{i,j}\}$ with the given dual multipliers $\lambda$. In some embodiments, the one or more GPUs may also parallel compute, for the $i_{th}$ user, $$\sum_{j=1}^{M} p_{i,j} x_{i,j}, \sum_{j=1}^{M} x_{i,j} \log x_{i,j},$$

and $$\sum_{j=1}^{M} b_{i,j,k} x_{ij}$$

for each k $\forall k \in \{1, \ldots, K\}$. These values may be subsequently used to compute one or more objective functions' values.

In some embodiments, the parallelly computed values may be reduced (e.g., aggregated) by performing parallel reductions at step 330. For example, the parallel reductions may collect the $$\sum_{j=1}^{M} p_{i,j} x_{i,j}, \sum_{j=1}^{M} x_{i,j} \log x_{i,j},$$

and $$\sum_{j=1}^{M} b_{i,j,k} x_{ij}$$

for each k $\forall k \in \{1, \ldots, K\}$ and compute $$\sum_{i=1}^{N} \sum_{j=1}^{M} p_{i,j} x_{i,j}, \sum_{i=1}^{N} \sum_{j=1}^{M} \alpha x_{i,j} \log x_{i,j},$$

and $$\sum_{i=1}^{N} \sum_{j=1}^{M} b_{i,j,k} x_{ij} - B_k,$$

respectively, to obtain the values for the primal and dual objective functions (e.g., formula (5) and (6)). In some embodiments, the parallel reductions may occur on the one or more GPUs, and the final results of the reductions may be delivered to a central processing unit (CPU).

In some embodiments, the final results of the parallel reductions may be used to determine whether the workflow 300 should be terminated at step 340. The termination may occur when one or more exit conditions are met. In some embodiments, the one or more exit conditions may comprise whether the dual multipliers are converged, whether the primal objective function value and the dual objective function value are converged, another suitable condition, or any combination thereof. In response to none of the exit conditions being satisfied, the dual multipliers may be updated based on the reduction results, and the workflow 300 may jump back to 320 to repeat the process. In response to at least one of the exit conditions being satisfied, the workflow 300 may output (e.g., at step 350) the resource allocation plans determined at step 320 as a final resource allocation solution.

In some embodiments, the workflow 300 may be represented as the following pseudo code.

Figure 4:
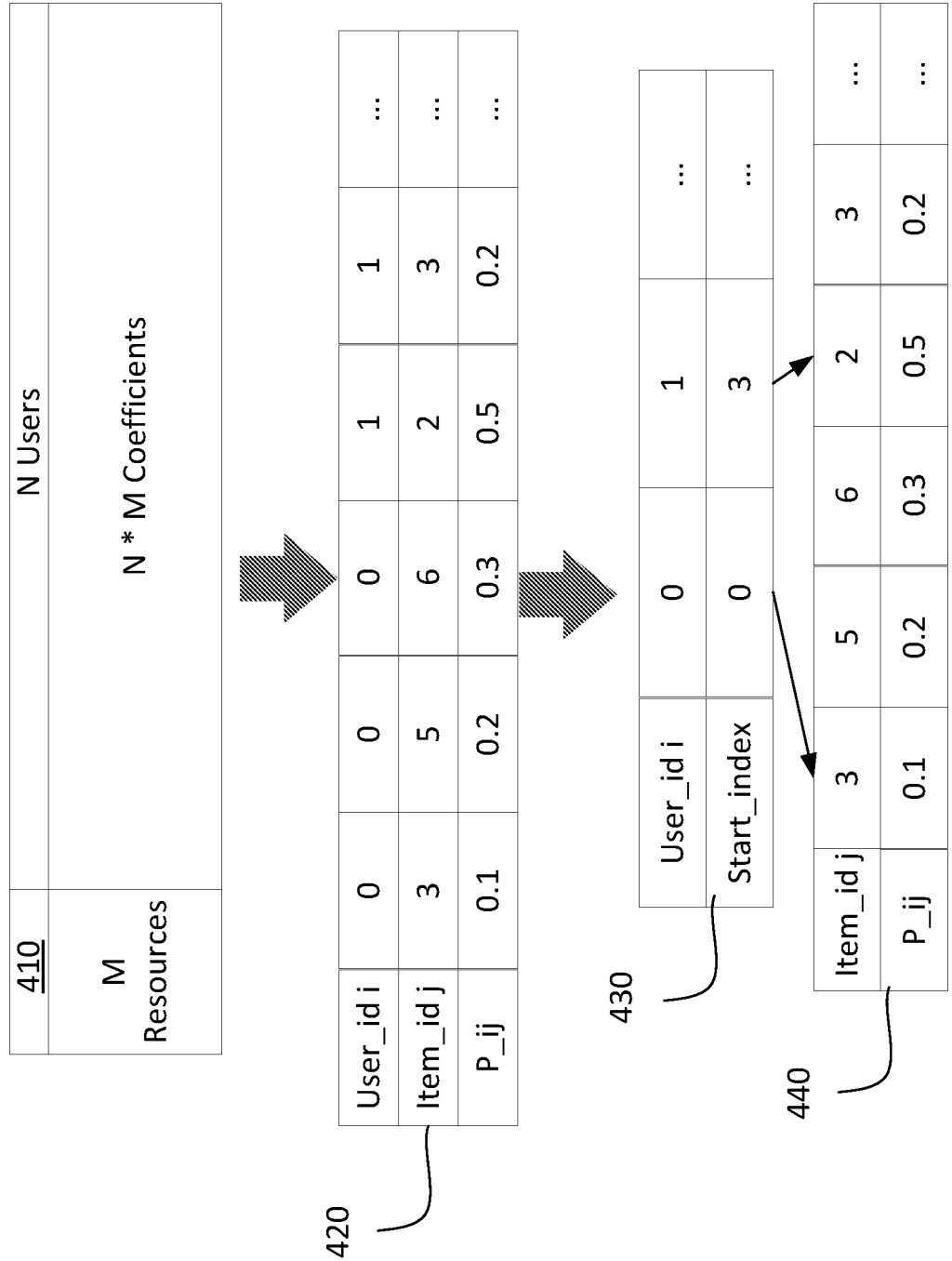
FIG. 4 illustrates an example GPU memory layout for determining optimal resource allocation, in accordance with various embodiments.

Receive inputs
Initialize dual multipliers $\lambda$
For itr=1 to max ltr do:
  # Parallel on GPU for each user i
  compute $\{x_{i,j}\}$ with given
  # Parallel on GPU for each user i
  compute $$\sum_{j=1}^{M} p_{i,j} x_{i,j}, \sum_{j=1}^{M} x_{i,j} \log x_{i,j}, \sum_{j=1}^{M} b_{ijk} x_{ij}$$

for each k
  # Parallel reduction on GPU/CPU
  compute gradients g of $\lambda$ with given $\{x_{i,j}\}$
  compute dual objective function value $f_d$ with given $\lambda$ and $\{x_{i,j}\}$
  compute primal objective function value $f_p$ with given $\{x_{i,j}\}$
  if hasConverged(g, $f_d$, $f_p$) then
    break
  end
  update $\lambda$
end FIG. 4 illustrates an example GPU memory layout for determining optimal resource allocation, in accordance with various embodiments. In some embodiments, if one or more GPUs are used to parallelly search (e.g., using multiple threads in the GPUs) for the resource allocation plans for a plurality of users, the memory layout of the GPUs may be vital for memory access and related computing efficiency. In some embodiments, the layout of one or more coefficient vectors, matrices and tensors (which are usually sparse) may be organized into a compact format. For example, non-zero entries of a two-dimensional N×M coefficients (e.g., N is the number of users to be allocated resources, M is the number of resources to be allocated) may be organized in to a row-major format with user identifier as the primary dimension and resource identifier as the secondary dimension. Each user identifier value may identify a user, and each resource identifier value may identify a resource. As another example, a three-dimension tensor (e.g., $b_{ijk}$ in formula (7)) may use a user identifier as the primary dimension, a constraint identifier as the secondary dimension, and a resource identifier as the tertiary dimension.

The example memory layout in FIG. 4 may be used to store N×M coefficients 410 in one or more GPUs' memories.

The memories may refer to each GPU's global memory, each GPU block's shared memory, each thread's local memory, another suitable memory, or any combination thereof. The N×M coefficients may refer to the $p_{i,j}$ in formulas (5), (6), and (7) (e.g., the projected (or predetermined/known) profits for allocating a plurality of resources to a plurality of users). In some embodiments, the memory layout for the coefficients 410 may be represented as table 420, where the primary dimension is user_id (e.g., user identifier), the secondary dimension is item_id (e.g., resource identifier), and each pair of user_id i and item_id j is mapped to a non-zero $p_{i,j}$. The table 420 in FIG. 2 includes several example values. For example, for user 0 (e.g., i=0), there are three $p_{i,j}$ have non-zero values: $p_{0,3}$=0.1, $p_{0,5}$=0.2, $p_{0,6}$=0.3; for user 1 (e.g., i=1), there are at least two $p_{i,j}$ have non-zero values: $p_{1,2}$=0.5, $p_{1,3}$=0.2. In some embodiments, the non-zero coefficients of one user may be stored contiguously (e.g., the non-zero values for user 0 are stored as the first three columns in table 420 in FIG. 4). Since the computations (e.g., $$\sum_{j=1}^{M} p_{i,j} x_{i,j}$$

for each user i) during the parallel processing phase (e.g., module 114 in FIG. 1, step 220 and 230 in FIG. 2, and step 320 in FIG. 3) only need the non-zero $p_{i,j}$ values for each user i, the memory layout in table 420 may allow the GPU to access these values with constant time complexity (e.g., O(1) per read), rather than using binary searches with quasilinear time complexity (e.g., O(log N) per read).

In some embodiments, the storage efficiency of the memory layout of table 420 may be further improved by using two tables: an index table 430 and a value table 440. As shown in FIG. 4, the index table 430 may use user_id as the primary dimension. Each user_id value may be mapped to a start_index in the value table 440. The value table may use item_id as the primary dimension. Each item_id value may be mapped to a non-zero $p_{i,j}$ value. In one embodiment, the start_index may point to the index of the first non-zero $p_{i,j}$ value for the user specified by the user_id value. For example, in FIG. 4, user 0 has three non-zero $p_{i,j}$ values (0.1, 0.2, 0.3) stored in the value table 440 with index 0, 1, and 2 respectively. The user_id value 0 in the index table 430 may be mapped to the start_index 0, which points to the index 0 in the value table. Similarly, user 1 is mapped to the start_index 3 (e.g., index 3) in the value table where the first non-zero $p_{i,j}$ value (0.5) is stored. When the thread is calculating $$\sum_{j=1}^{M} p_{i,j} x_{i,j}$$

for user 0, it may first check the index table's first start_index (corresponding to user 0), which points to the starting index of the non-zero $p_{i,j}$ values for user 0. Then the thread may sequentially read the $p_{i,j}$ values until the next user's start_index (e.g., start_index 3 for user 1). This approach may not only allow the one or more GPUs to access the memories with constant time complexity per read, but also save the memory space by avoiding storing the repetitive entries (e.g., the three user_id 0s in table 420 may only need to store once in table 430).

Figure 5:
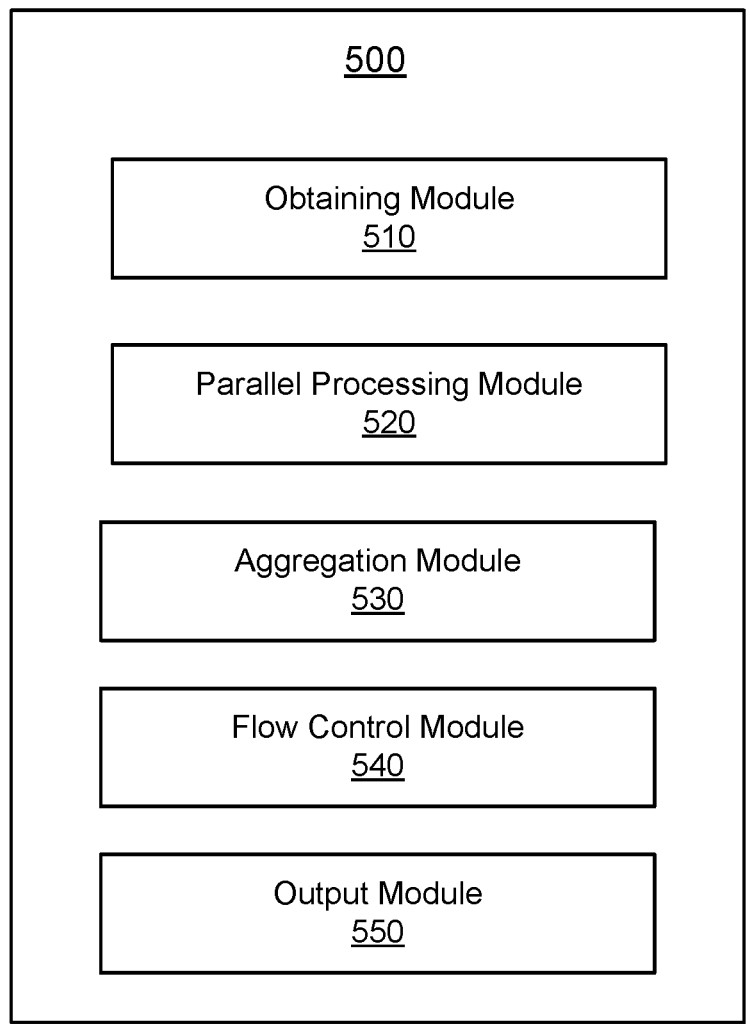
FIG. 5 illustrates an example computer system for determining optimal resource allocation, in accordance with various embodiments.

FIG. 5 illustrates a block diagram of a computer system 500 apparatus for optimizing resource allocation in accordance with some embodiments. The components of the computer system 500 presented below are intended to be illustrative. Depending on the implementation, the computer system 500 may include additional, fewer, or alternative components.

The computer system 500 may be an example of an implementation of one or more modules of the computing system 102. The device 200 and the workflow 300 may be implemented by the computer system 500. The computer system 500 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 300. The computer system 500 may comprise various units/modules corresponding to the instructions (e.g., software instructions).

In some embodiments, the computer system 500 may be referred to as an apparatus for optimizing resource allocation. The apparatus may comprise a obtaining module 510 for obtaining a plurality of coefficients corresponding to a specific resource allocation optimization inquiry (e.g., a primal resource allocation optimization), wherein the coefficients may comprise information of the resources to be allocated (e.g., projected/predetermined/known profits and costs associated, global constraints, local constraints), information of the users receiving the resources (e.g., quantities), another suitable information, or any combination thereof; a parallel processing 520 for processing a plurality of first objective functions in parallel to determine a plurality of allocation plans and determining a plurality of profits and costs for the platform in parallel based on the plurality of the allocation plans; an aggregating module 530 for aggregating the calculated profits and costs using parallel reduction; a flow control module 540 for updating the one or more dual multipliers based on the aggregated costs to determine whether an exit condition is satisfied and in response to the exit condition not being satisfied, repeating the processing the plurality of the first objective functions based on the updated one or more dual multipliers. The obtaining module 510 may correspond to the optimization modelling module 112. The parallel processing module 520 may correspond to the parallel processing module 114. The aggregating module 530 may correspond to the aggregating module 116. The flow control module 540 may correspond to the flow control module 118.

The techniques described herein may be implemented by one or more special-purpose computing devices. The special-purpose computing devices may be desktop computer systems, server computer systems, portable computer systems, handheld devices, networking devices or any other device or combination of devices that incorporate hardwired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 6:
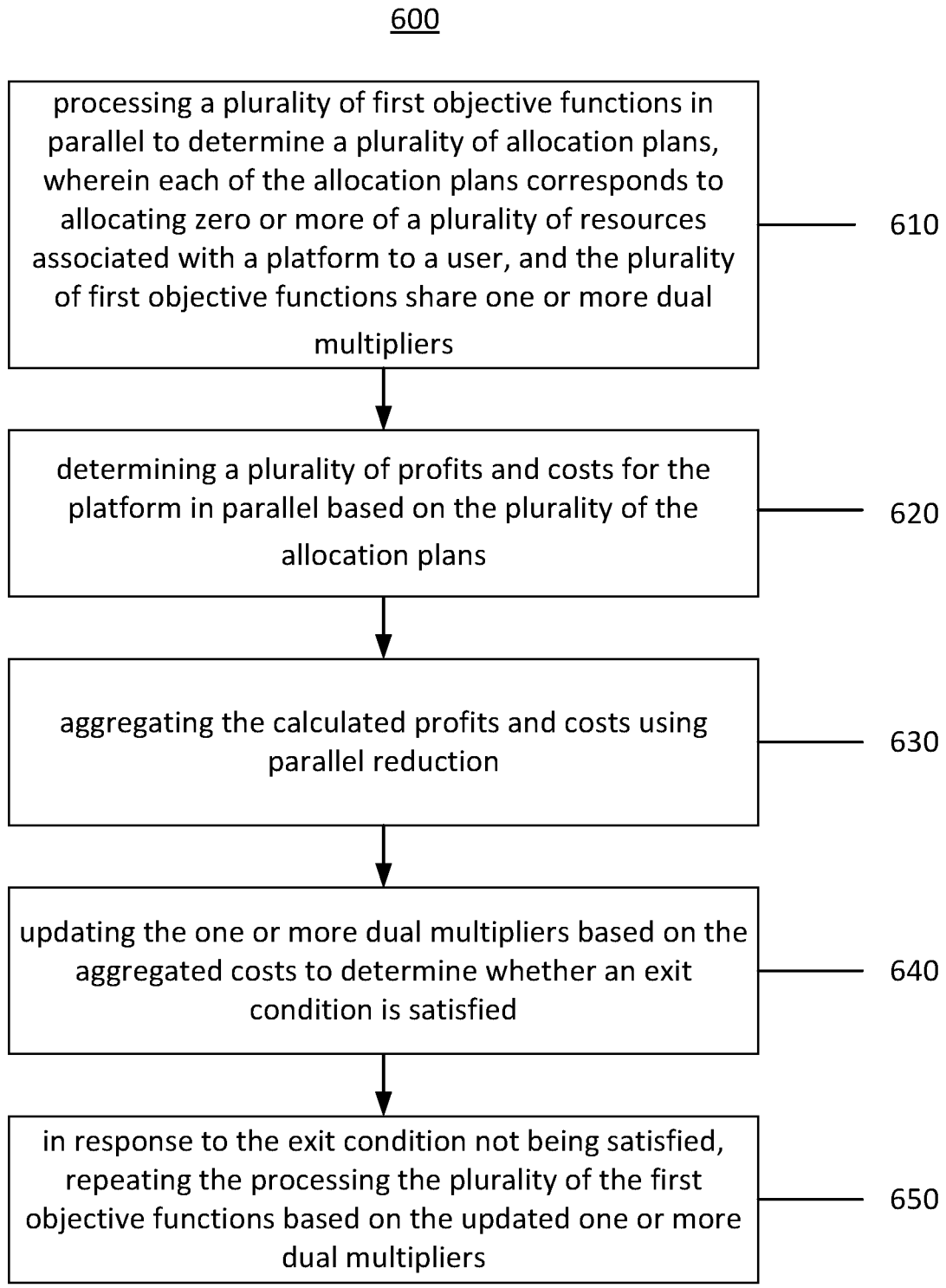
FIG. 6 illustrates a method for optimizing resource allocation, in accordance with various embodiments.

FIG. 6 illustrates a method for optimizing resource allocation, in accordance with various embodiments. The method 600 may be performed by a device, apparatus, or system for optimizing resource allocation. The method 600 may be performed by one or more modules/components of the environment or system illustrated by FIGS. 1-5, such as the computing system 102. The operations of the method 600 presented below are intended to be illustrative. Depending on the implementation, the method 600 may include additional, fewer, or alternative steps performed in various orders or in parallel.

Block 610 includes processing a plurality of first objective functions in parallel to determine a plurality of allocation plans, wherein each of the allocation plans corresponds to allocating zero or more of a plurality of resources associated with a platform to a user, and the plurality of first objective functions share one or more dual multipliers. In some embodiments, the processing a plurality of first objective functions in parallel may comprise processing the plurality of first objective functions in parallel on a Graphics Processing Unit (GPU). In some embodiments, each of the plurality of first objective functions may comprise N×M coefficients, N being the number of the plurality of users, M being the number of the plurality of resources; and prior to the processing a plurality of first objective functions, the method may further comprise: storing, in a memory of the GPU, non-zero coefficients of the N×M coefficients with a value table and an index table for the GPU to access the memory with constant time complexity per read; the value table may use a resource identifier as a primary dimension; and the index table may use a user identifier as a primary dimension. In some embodiments, the storing, in a memory of the GPU, non-zero values of the N×M coefficients with a value table and an index table may comprise: in the value table, storing resource identifier values mapped to the non-zero coefficients; and in the index table, storing one or more user identifier values mapped to one or more indexes in the value table, wherein for each user identifier value, the corresponding index may point to one of the non-zero coefficients associated with a user identified by the each user identifier value. In some embodiments, each of the plurality of first objective functions may subject to K constraints, and may comprise N×M×K coefficients; and prior to the processing a plurality of first objective functions, the method may further comprise: storing, in a memory of the GPU, non-zero values of the N×M×K coefficients into a row-major format comprising at least three dimensions for the GPU to access the memory with constant time complexity per read.

Block 620 includes determining a plurality of profits and costs for the platform in parallel based on the plurality of the allocation plans. In some embodiments, the determining a plurality of profits and costs for the platform in parallel may comprise determining the plurality of profits and costs in parallel on the GPU.

Block 630 includes aggregating the calculated profits and costs using parallel reduction. In some embodiments, the aggregating the calculated profits and costs using parallel reduction may comprise aggregating the calculated profits and costs by the GPU and a Central Processing Units (CPU).

Block 640 includes updating the one or more dual multipliers based on the aggregated costs to determine whether an exit condition is satisfied. In some embodiments, the updating the one or more dual multipliers may comprise updating the one or more dual multipliers by the CPU. In some embodiments, the method may further comprise: in response to the exit condition being satisfied, allocating the plurality of resources according to the plurality of allocation plans, wherein the number of the plurality of users is N, the number of the plurality of resources is M, an $i_{th}$ of the plurality of allocation plans corresponds to an $i_{th}$ user, $\forall i \in \{1, \ldots, N\}$, and the $i_{th}$ allocation plan may be represented as a vector comprising M elements $x_{ij}$, $\forall j \in \{1, \ldots, M\}$, each $x_{ij}$ representing whether a $j_{th}$ resource is being allocated to the $i_{th}$ user. In some embodiments, the exit condition may comprise whether the one or more dual multipliers are converged. In some embodiments, the exit condition may comprise whether a value of the primal objective function and a value of the dual objective function are converged, and the method may further comprise: determining the value of the primal objective function based on the aggregated profits and costs; and determining the value of the dual objective function based on the one or more dual multipliers and the aggregated profits and costs.

Block 650 includes in response to the exit condition not being satisfied, repeating the processing the plurality of the first objective functions based on the updated one or more dual multipliers.

In some embodiments, before processing the plurality of first objective functions in parallel, the method may further comprise: transforming a primal objective function for optimizing the resource allocation into a dual objective function based on Lagrangian techniques for dual problem transformation; and decomposing the dual objective function into the plurality of the first objective functions.

Figure 7:
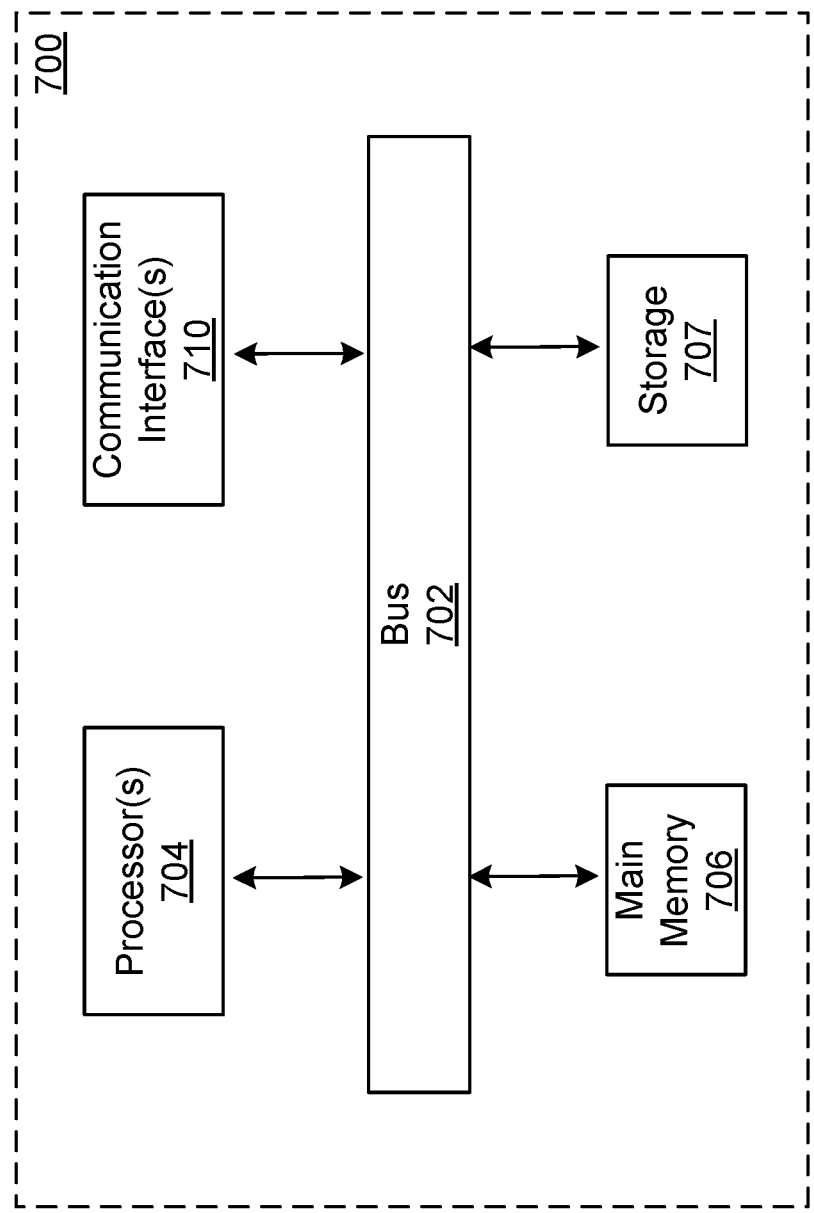
FIG. 7 illustrates an example electronic device for determining optimal resource allocation, in accordance with various embodiments

FIG. 7 illustrates an example electronic device for optimizing resource allocation. The electronic device may be used to implement one or more components of the systems, workflow, methods shown in FIG. 1-6. The electronic device 700 may comprise a bus 702 or other communication mechanism for communicating information and one or more hardware processors 704 coupled with bus 702 for processing information. Hardware processor(s) 704 may be, for example, one or more general purpose microprocessors.

The electronic device 700 may also include a main memory 706, such as a random-access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, may render electronic device 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH- EPROM, NVRAM, any other memory chip or cartridge, or networked versions of the same.

The electronic device 700 may implement the techniques described herein using customized hard-wired logic, one or more ASICs or FPGAs, firmware and/or program logic which in combination with the electronic device may cause or program electronic device 700 to be a special-purpose machine. According to one embodiment, the techniques herein are performed by electronic device 700 in response to processor(s) 704 executing one or more sequences of one or more instructions contained in main memory 706. Such instructions may be read into main memory 706 from another storage medium, such as storage device 707. Execution of the sequences of instructions contained in main memory 706 may cause processor(s) 704 to perform the process steps described herein. For example, the processes/methods disclosed herein may be implemented by computer program instructions stored in main memory 706. When these instructions are executed by processor(s) 704, they may perform the steps as shown in corresponding figures and described above. In alternative embodiments, hard-wired circuitry may be used in place of or in combination with software instructions.

The electronic device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for optimizing resource allocation, comprising:
    processing a plurality of first objective functions in parallel to determine a plurality of allocation plans, wherein each of the allocation plans corresponds to allocating zero or more of a plurality of resources associated with a platform to a user, and the plurality of first objective functions share one or more dual multipliers;
    determining a plurality of profits and costs for the platform in parallel based on the plurality of the allocation plans;
    aggregating the calculated profits and costs using parallel reduction;
    updating the one or more dual multipliers based on the aggregated costs to determine whether an exit condition is satisfied; and
    in response to the exit condition not being satisfied, repeating the processing the plurality of the first objective functions based on the updated one or more dual multipliers.

2. The method of claim 1, wherein:
    the processing a plurality of first objective functions in parallel comprises processing the plurality of first objective functions in parallel on a Graphics Processing Unit (GPU);
    the determining a plurality of profits and costs for the platform in parallel comprises determining the plurality of profits and costs in parallel on the GPU;
    the aggregating the calculated profits and costs using parallel reduction comprises aggregating the calculated profits and costs by the GPU and a Central Processing Units (CPU); and the updating the one or more dual multipliers comprises updating the one or more dual multipliers by the CPU.

3. The method of claim 2, wherein:
each of the plurality of first objective functions comprises N×M coefficients, N being the number of the plurality of users, M being the number of the plurality of resources; and
prior to the processing a plurality of first objective functions, the method further comprises: storing, in a memory of the GPU, non-zero coefficients of the N×M coefficients with a value table and an index table for the GPU to access the memory with constant time complexity per read;
the value table uses a resource identifier as a primary dimension; and
the index table uses a user identifier as a primary dimension.

4. The method of 3, wherein the storing, in a memory of the GPU, non-zero values of the N×M coefficients with a value table and an index table comprises:
in the value table, storing resource identifier values mapped to the non-zero coefficients; and
in the index table, storing one or more user identifier values mapped to one or more indexes in the value table, wherein for each user identifier value, the corresponding index points to one of the non-zero coefficients associated with a user identified by the each user identifier value.

5. The method of claim 2, wherein:
each of the plurality of first objective functions is subject to K constraints, and comprises N×M×K coefficients; and
prior to the processing a plurality of first objective functions, the method further comprises: storing, in a memory of the GPU, non-zero values of the N×M×K coefficients into a row-major format comprising at least three dimensions for the GPU to access the memory with constant time complexity per read.

6. The method of claim 1, further comprising:
in response to the exit condition being satisfied, allocating the plurality of resources according to the plurality of allocation plans, wherein the number of the plurality of users is N, the number of the plurality of resources is M, an $i_{th}$ of the plurality of allocation plans corresponds to an $i_{th}$ user, $\forall i \in \{1, \ldots, N\}$, and the $i_{th}$ allocation plan is represented as a vector comprising M elements $x_{ij}$, $\forall j \in \{1, \ldots, M\}$, each $x_{ij}$ representing whether a $j_{th}$ resource is being allocated to the $i_{th}$ user.

7. The method of claim 1, wherein the exit condition comprises whether the one or more dual multipliers are converged.

8. The method of claim 1, before processing the plurality of first objective functions in parallel, further comprising:
transforming a primal objective function for optimizing the resource allocation into a dual objective function based on Lagrangian techniques for dual problem transformation; and
decomposing the dual objective function into the plurality of the first objective functions.

9. The method of claim 8, wherein the exit condition comprises whether a value of the primal objective function and a value of the dual objective function are converged, and the method further comprises:
determining the value of the primal objective function based on the aggregated profits and costs; and
determining the value of the dual objective function based on the one or more dual multipliers and the aggregated profits and costs.

10. A system for optimizing resource allocation, comprising one or more processors and one or more non-transitory computer-readable memories coupled to the one or more processors and configured with instructions executable by the one or more processors to cause the system to perform operations comprising:
processing a plurality of first objective functions in parallel to determine a plurality of allocation plans, wherein each of the allocation plans corresponds to allocating zero or more of a plurality of resources associated with a platform to a user, and the plurality of first objective functions share one or more dual multipliers;
determining a plurality of profits and costs for the platform in parallel based on the plurality of the allocation plans;
aggregating the calculated profits and costs using parallel reduction;
updating the one or more dual multipliers based on the aggregated costs to determine whether an exit condition is satisfied; and
in response to the exit condition not being satisfied, repeating the processing the plurality of the first objective functions based on the updated one or more dual multipliers.

11. The system of claim 10, wherein:
the processing a plurality of first objective functions in parallel comprises processing the plurality of first objective functions in parallel on a Graphics Processing Unit (GPU);
the determining a plurality of profits and costs for the platform in parallel comprises determining the plurality of profits and costs in parallel on the GPU;
the aggregating the calculated profits and costs using parallel reduction comprises aggregating the calculated profits and costs by the GPU and a Central Processing Units (CPU); and
the updating the one or more dual multipliers comprises updating the one or more dual multipliers by the CPU.

12. The system of claim 11, wherein:
each of the plurality of first objective functions comprises N×M coefficients, N being the number of the plurality of users, M being the number of the plurality of resources; and
prior to the processing a plurality of first objective functions, the operations further comprise: storing, in a memory of the GPU, non-zero coefficients of the N×M coefficients with a value table and an index table for the GPU to access the memory with constant time complexity per read;
the value table uses a resource identifier as a primary dimension; and
the index table uses a user identifier as a primary dimension.

13. The system of claim 12, wherein the storing, in a memory of the GPU, non-zero values of the N×M coefficients with a value table and an index table comprises:
in the value table, storing resource identifier values mapped to the non-zero coefficients; and
in the index table, storing one or more user identifier values mapped to one or more indexes in the value table, wherein for each user identifier value, the corresponding index points to one of the non-zero coefficients associated with a user identified by the each user identifier value.

14. The system of claim 11, wherein:
each of the plurality of first objective functions is subject to K constraints, and comprises N×M×K coefficients; and
prior to the processing a plurality of first objective functions, the operations further comprise: storing, in a memory of the GPU, non-zero values of the N×M×K coefficients into a row-major format comprising at least three dimensions for the GPU to access the memory with constant time complexity per read.

15. The system of claim 10, wherein the exit condition comprises whether the one or more dual multipliers are converged.

16. The system of claim 10, wherein before processing the plurality of first objective functions in parallel, the operations further comprise:
transforming a primal objective function for optimizing the resource allocation into a dual objective function based on Lagrangian techniques for dual problem transformation; and
decomposing the dual objective function into the plurality of the first objective functions.

17. The system of claim 16, wherein the exist condition comprises whether a value of the primal objective function and a value of the dual objective function are converged, and the operations further comprise:
determining the value of the primal objective function based on the aggregated profits and costs; and
determining the value of the dual objective function based on the one or more dual multipliers and the aggregated profits and costs.

18. A non-transitory computer-readable storage medium for optimizing resource allocation configured with instructions executable by one or more processors to cause the one or more processors to perform operations comprising:
processing a plurality of first objective functions in parallel to determine a plurality of allocation plans, wherein each of the allocation plans corresponds to allocating zero or more of a plurality of resources associated with a platform to a user, and the plurality of first objective functions share one or more dual multipliers;
determining a plurality of profits and costs for the platform in parallel based on the plurality of the allocation plans;
aggregating the calculated profits and costs using parallel reduction;
updating the one or more dual multipliers based on the aggregated costs to determine whether an exit condition is satisfied; and
in response to the exit condition not being satisfied, repeating the processing the plurality of the first objective functions based on the updated one or more dual multipliers.

19. The storage medium of claim 18, wherein:
the processing a plurality of first objective functions in parallel comprises processing the plurality of first objective functions in parallel on a Graphics Processing Unit (GPU);
the determining a plurality of profits and costs for the platform in parallel comprises determining the plurality of profits and costs in parallel on the GPU;
the aggregating the calculated profits and costs using parallel reduction comprises aggregating the calculated profits and costs by the GPU and a Central Processing Units (CPU); and
the updating the one or more dual multipliers comprises updating the one or more dual multipliers by the CPU.

20. The storage medium of claim 18, wherein the exit condition comprises whether the one or more dual multipliers are converged.

* * * * *